J. L. WOLFE.
TEST INDICATOR.
APPLICATION FILED SEPT. 16, 1910.
1,256,967.
Patented Feb. 19, 1918.
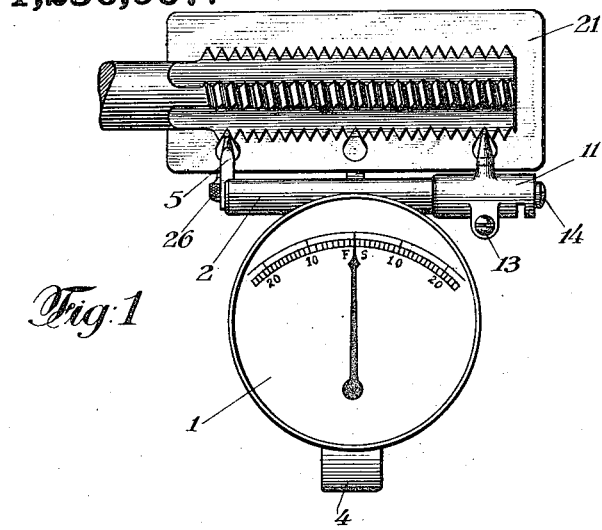
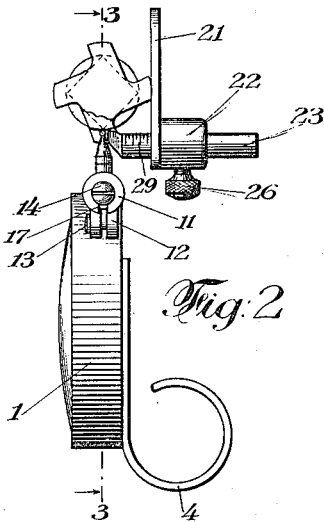
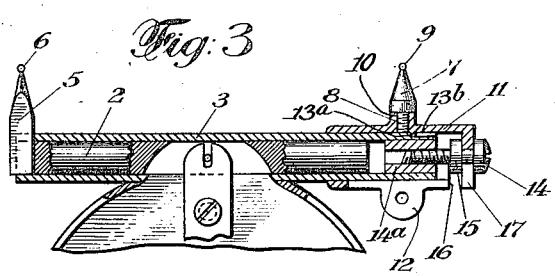
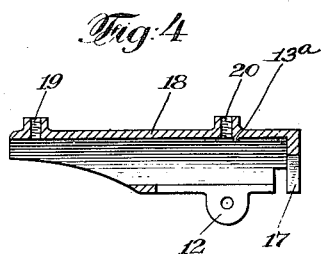
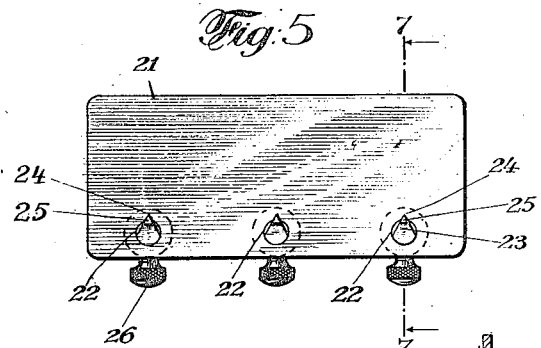
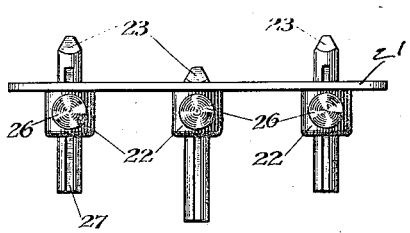
Witnesses
M. Lobel.
G. B. Prindle.
Inventor
Joseph L. Wolfe
By Attorneys
Prindle Wright

UNITED STATES PATENT OFFICE.

JOSEPH L. WOLFE, OF BRIDGEPORT, CONNECTICUT.

TEST-INDICATOR.

1,256,967.

Specification of Letters Patent.   Patented Feb. 19, 1918.

Application filed September 16, 1910.   Serial No. 582,291.

*To all whom it may concern:*

Be it known that I, JOSEPH L. WOLFE, of Bridgeport, in the county of Fairfield and in the State of Connecticut, have invented a certain new and useful Improvement in Test-Indicators; and do hereby declare that the following is a full, clear, and exact description thereof.

My invention relates to an improvement in test indicators and is designed especially to provide a test indicator capable of measuring the accuracy or inaccuracy of screw threads on taps, dies, bolts and screws.

In general, the test indicator which constitutes the improvement of my invention is constructed in the same manner as the test indicator shown and described in my copending application Serial #445,239, filed July 24th, 1908. It differs, however, from the test indicator shown and described in the application referred to in that the operating plunger for the test indicator is so constructed and provided with attachments in such a manner as to adapt the test indicator to be used for measuring the accuracy of the longitudinal advance of threads as above described. In other words, the object of said apparatus is to determine how many threads there are on a particular screw-threaded bolt, tap, die or screw to a given distance, such, for example, as one inch or two inches. In cutting screw threads it is determined beforehand how many screw threads there are to be to a given distance such as an inch or two inches, but there is always, at least in screw threads as they are now found in the market, a considerable degree of inaccuracy, owing to the fact that there is a fraction of a screw thread, more or less, to the given distance.

I have shown certain embodiments of my invention in the accompanying drawings, in which—

Figure 1 is an elevation of a tap being measured by the test indicator to determine the accuracy of the thread;

Fig. 2 is a side elevation of the same;

Fig. 3 is an enlarged detail partly in section of the upper portion of the test indicator;

Fig. 4 is a vertical section of a modified form of sleeve used for holding the fixed pointer;

Fig. 5 is an elevation of the plate used for guiding the pointers on the test indicator;

Fig. 6 is a bottom view of the same; and

Fig. 7 is a vertical section of the plate shown in Fig. 5 and taken on line 7—7.

In Figs. 1 to 3 of the accompanying drawings, 1 represents a test indicator having an operating plunger 2 situated in a barrel 3 on the top of the dial of the test indicator. The dial of the indicator is provided with a scale of any desired kind, the scale shown in Fig. 1 comprising a number of equal subdivisions with letters indicating, according to the direction of the movement of the pointer, whether the particular screw thread measured is a fast or slow thread. The test indicator is adapted to be supported in proximity to the object being measured by means of a spring clip 4 attached to the rear of the test indicator at a point opposite the location of the plunger 2.

The plunger 2 is provided at one end with a right angle pointed extension 5 which extension is provided with a small knob or sphere 6 upon its end. The pointer operates in a short slot situated in one side of the end of the barrel 3. On the other end of the barrel 3 there is located a fixed pointer 7 having at one end a screw 8 and at the other end a ball or sphere 9 in a manner similar to the construction of the pointer 5. The screw 8 is designed to be received in a socket 10 carried by sleeve 11 which fits over the end of the barrel 3. The sleeve 11 has a pair of downwardly directed ears 12 for receiving a screw 13 to tighten the sleeve 11 upon the barrel 3. In order to prevent relative rotation between the sleeve 11 and the barrel 3, the former is provided with a projection 13ª which fits into a groove 13ᵇ upon the outside of the barrel 3. The sleeve 11 may be accurately adjusted longitudinally on the barrel 3 for the purpose of locating the pointers 5 and 7 a predetermined distance apart, such as two (2") inches, for example, by means of a screw 14. The screw 14 has a flange 15 located between its ends which is so positioned with regard to the head of the screw 14 as to be received within the slot 16 located in the underface of the sleeve 11. In placing the screw 14 in the sleeve 11, the screw is moved upwardly so that its end passes between the ears 12. The sleeve 11 is also provided with a slot 17 upon its underface to permit the screw-threaded portion of the screw 14 to pass into the barrel 3 while the flange 15 is passing through the slot 16. The screw-threaded portion of the screw 14 is designed to be received by a screw-threaded sleeve 14ª fixedly secured within the end of barrel 3.

It will be seen that by means of this construction, the rotation of the screw 14 will cause the sleeve 11 to slide backwardly or forwardly upon the barrel 3 according to the direction of the rotation of the screw 14. Once that the sleeve 11 has been adjusted in this manner, it can be permanently secured in its adjusted position by tightening the screw 13 which passes through the ears 12. Upon applying the test indicator so constructed to a screwthread of any kind so that the pointers 5 and 7 fall within different portions of the screw-thread at different points along the tap, die, bolt or screw, the distance between these two points may be accurately gaged and the pointer of the test indicator will show to what extent said distance varies from the predetermined distance between the pointers 5 and 7 in the normal position of said pointers or when the test indicator gives a reading at zero.

It will be noted that the pointer 5 is designed to move either toward or away from the fixed pointer 7 and that the indicator is adapted to register movements in both directions.

The modification shown in Fig. 4 is constructed in the same manner as the other modification already referred to except that a sleeve 18 is provided which is longer than the sleeve 11 and which is provided with two sockets 19 and 20 to receive the fixed pointer 7 so that the standard of measurement or the distance located between the fixed pointer and the movable pointer may be either a given longer distance or a given shorter distance, as desired. The most convenient distances for this purpose I have found to be one (1″) inch and two (2″) inches. When it is desired to use one inch as a standard distance, the fixed pointer 7 will be moved into the socket 19 and when a distance of two inches is desired to be used, the fixed pointer 7 will be located in the socket 20.

It will be seen that in using the above construction, it is necessary in order to obtain the greatest accuracy in measuring a screwthread, to be sure that the pointers 5 and 7 are located in a plane passing through the axis of the screw, in other words, that the pointer is to be located on a central line.

I have therefore, provided an apparatus which absolutely insures that the pointers 5 and 7 are located along such a line when measuring a screwthread. This apparatus is shown in Figs. 5, 6 and 7. In said figures, a base plate 21 is provided, said plate being provided with a plurality of sleeves or sockets 22 to receive pointers or plungers 23, having pointed ends 24. The pointed ends, it will be noted, are provided with flat faces 25. Screws 26 are carried by the sleeves 22 to secure the plungers 23 in any adjusted position. The ends of the screws 26 are received in longitudinal guide-ways 27 carried by the plungers in order to prevent their rotation. Within each of the sleeves 22 there is located a spring 28 which holds each of the plungers 23 tight in its socket during the adjustment thereof and offers a frictional resistance to the adjustment of the plunger when the screw is loosened. Each of the plungers 23 is provided with a series of graduations 29 so as to indicate the positions of the plungers when adjusted.

In using this apparatus in case the distance of a screwthread to be measured is two inches (2″), the two outside plungers 23 are used and the middle plunger is disregarded for the time being. In case however, the standard of measurement is one inch (1″), one of the outside screws is made use of in conjunction with the central plunger, while the remaining plunger is disregarded. In Fig. 1 I have shown the method of using this apparatus where the standard of measurement is two inches, and as shown in said figure, prior to making the measurement of the screw with the test indicator, the two end plungers 23 are adjusted by first moving the screws 26 and the graduations 29 so that each of said plungers is extended, as indicated by the graduations 29, a distance equal to the radius of the screwthread at the particular point where the measurement of the screwthread is to be made. As a consequence, the flat ends 25 of the plungers 23 are located along a central line located in a plane passing through the axis of the screw when the base plate 21 is placed flat against one side of the screw, as shown in Fig. 2. After the apparatus has been applied to the screw in this manner, with the flat ends 25 located along a central line as described, the test indicator 1 is then applied to the screw in such a manner that the pointers 5 and 7 fall immediately against the flat ends 25 of the plungers 23. In this position of the test indicator, it will be seen that the pointers 5 and 7 are accurately placed along the central line referred to and any indication made by the movable hand on the test indicator therefore, accurately indicates the exact position of the two portions of the screwthread to be measured.

While I have shown certain modifications of my invention in the accompanying drawings, I wish it to be understood that many changes may be made therein without departing from the spirit of my invention.

I claim:

1. A test indicator having means for measuring the longitudinal advance of screw threads comprising a movable pointer, a plunger carrying the same, a barrel in which the plunger moves, an adjustably fixed pointer, and a screw for adjusting the same.

2. A test indicator having means for measuring the longitudinal advance of screw threads comprising a movable pointer, a plunger carrying the same, a barrel in which the plunger moves, an adjustably fixed pointer, a sleeve upon which the fixed pointer is supported, said sleeve surrounding the barrel and a screw for adjusting the same.

3. A test indicator having means for measuring the longitudinal advance of screw threads comprising a movable pointer, a plunger carrying the same, a barrel in which the plunger moves, an adjustably fixed pointer, a slotted clamping sleeve upon which the fixed pointer is supported, said sleeve surrounding the barrel and a screw for adjusting the same.

4. A test indicator having means for measuring the longitudinal advance of screw threads comprising a movable pointer, a plunger carrying the same, a barrel in which the plunger moves, an adjustably fixed pointer, a slotted clamping sleeve having clamping ears with binding means, upon which sleeve the fixed pointer is supported, said sleeve surrounding the barrel and a screw for adjusting the same.

5. A test indicator having means for measuring the longitudinal advance of screw threads comprising a movable pointer, a plunger carrying the same, a barrel in which the plunger moves, an adjustably fixed pointer, a slotted clamping sleeve having clamping ears with binding means, upon which sleeve the fixed pointer is supported, said sleeve surrounding the barrel.

6. An apparatus for finding a line on the surface of a screw located in a plane passing through the axis of the screw having a base plate and a plurality of pointers carried thereby, the ends of said pointers being adapted to be located on said line.

7. An apparatus for finding a line on the surface of a screw-thread located in a plane passing through the axis of the screw having a base plate and a plurality of adjustable pointers carried thereby the ends of said pointers being adapted to be located on said line.

8. An apparatus for finding a line on the surface of a screw-thread located in a plane passing through the axis of the screw having a base plate and a plurality of adjustable graduated pointers carried thereby, the ends of said pointers being adapted to be located on said line.

9. An apparatus for finding a line on the surface of a screw-thread located in a plane passing through the axis of the screw having a base plate and a plurality of flat-pointed pointers carried thereby the ends of said pointers being adapted to be located on said line.

10. An apparatus for finding a line on the surface of a screw-thread located in a plane passing through the axis of the screw comprising a base plate having sockets, a plurality of scaled and longitudinally adjustable pointers carried in said sockets in said plate and springs for tightening the pointers in their sockets.

In testimony that I claim the foregoing I have hereunto set my hand.

JOSEPH L. WOLFE.

Witnesses:
 FRANK J. KUSTERER,
 EDWARD H. WILLMANN.